United States Patent [19]
Yang

[11] Patent Number: 5,865,559
[45] Date of Patent: Feb. 2, 1999

[54] FLOAT PINS

[76] Inventor: George Yang, 14th Floor-17 No. 108 Shensi Rd., Taichung, Taiwan

[21] Appl. No.: 858,430

[22] Filed: May 19, 1997

[51] Int. Cl.[6] .................................................. B25G 3/18
[52] U.S. Cl. ..................... 403/322.1; 403/320; 403/321; 403/408.1; 411/21; 411/340
[58] Field of Search .................................. 403/315, 316, 403/317, 319, 154, 155, 217, 170, 49, 321, 322, 323, 324, 320, 408.1; 411/340, 345, 21

[56] References Cited

U.S. PATENT DOCUMENTS

| | | | |
|---|---|---|---|
| 1,177,869 | 4/1916 | Kelley | 403/322 X |
| 2,794,633 | 6/1957 | Delaney | 403/322 X |
| 4,355,917 | 10/1982 | Bunger | 403/322 X |
| 4,693,389 | 9/1987 | Kalen | 403/322 X |
| 5,090,275 | 2/1992 | McCann | 403/322 X |
| 5,310,273 | 5/1994 | Hara | 403/170 X |
| 5,437,515 | 8/1995 | Kuramoto et al. | 403/154 |
| 5,692,851 | 12/1997 | Pace | 403/322 X |

*Primary Examiner*—Blair M. Johnson
*Assistant Examiner*—Bruce A. Lev
*Attorney, Agent, or Firm*—Charles E. Baxley, Esq.

[57] ABSTRACT

A pin for fastening a number of floats together includes an inner pin and a stop member mounted therein. When the inner pin is rotated through an angle, the stop member extends beyond the pin for engagement with recesses defined in holed ears of the floats to thereby prevent rotational movements of the pin.

5 Claims, 10 Drawing Sheets

5,865,559

FLOAT PINS

BACKGROUND OF THE INVENTION

1. Field of the Invention

The present invention relates to float pins and, more particularly, to improved float pins which may reliably fasten floats together.

2. Description of the Related Art

Floats are used on water and secured together by pins. FIG. 10 of the drawings illustrates a typical float assembly 10 which includes a pin 20 for fastening a multiplicity of floats 101, 102, 103, and 104 together. One of a number of holed ears 105 of each float aligns with the associated holed ears of the other three floats, and the pin 20 is inserted through the holed ears 105 to fasten the floats together. As shown in FIGS. 10 to 12, the pin 20 includes an enlarged head 21 and a plurality of circumferentially spaced protrusions 22 formed on an outer periphery of a stem portion thereof. Referring to FIGS. 11 and 12, when inserting the pin 20 through the aligned ears 105, the protrusions 22 are firstly aligned with a number of recesses 106 defined in the holed ears 105, and the pin 20, after extending through the ears 105, is then rotated through an angle such that the protrusions 22 are no longer in alignment with the recesses 106, thereby preventing from disengagement of the pin 20 from the ears 105. Nevertheless, the pin 20, under impact of waves, may be rotated through an angle such that the protrusions 22 align with the recesses 105 and thus might disengage from the ears.

Therefore, there has been a long and unfulfilled need for an improved float pin which mitigates and/or obviates the above problem.

SUMMARY OF THE INVENTION

The present invention provides a pin for fastening a plurality of floats each having a plurality of holed ears in which each of the holed ears includes a plurality of recesses defined in an inner periphery thereof. The pin comprises an enlarged head and a stem, the enlarged head of the pin including a recess in an upper end thereof. A longitudinal bore extends the enlarged head portion and the stem. A first opening and a second opening are defined in a periphery of the stem and partially aligned and in communication with the longitudinal bore. A bore is defined in the periphery of the stem and extends in a direction transverse to the first opening.

A stop member is mounted in the pin and extends transverse to a longitudinal axis of the pin with a first end thereof in the first opening and a second end thereof in the second opening. The stop member includes a vertical hole extending along a direction substantially parallel to the longitudinal axis of the pin and a lateral hole extending through two sides of the stop member and in communication with the vertical hole. An axle hole is defined in the stop member and in alignment with the bore, and a pivotal axle extends through the bore and the axle hole. A block is received in the lateral hole of the stop member and includes a screw hole in alignment with the vertical hole.

An inner pin is mounted in the pin and includes an enlarged head received in the recess of the enlarged head of the pin. The inner pin further includes a threaded distal end which extends through the screw hole of the block.

The block is inside the first opening and the second opening of the pin when the inner pin is in a first position. When the inner pin is rotated through an angle to a second position, the stop member pivots about the pivotal axle to a second position in which two ends of the stop member extend beyond the pin for engaging with the recesses of the holed ears of the floats, thereby preventing rotating movements of the pin.

The pin may include a plurality of circumferentially spaced protrusions provided on a distal end of the stem thereof. A first recess is defined in an upper part of a periphery defining the vertical hole and a second recess is defined in a lower part of the periphery defining the vertical hole, in which the first and the second recesses are symmetric to a vertical axis along which the vertical hole extends.

Preferably, the enlarged head of the inner pin includes a hexagonal recess so as to be operated by a wrench.

In an embodiment of the invention, a second bore is defined in the periphery of the stem and extends in a direction transverse to the second opening, and an axle extends through the bore to limit movement of the stop member.

Other objects, advantages, and novel features of the invention will become more apparent from the following detailed description when taken in conjunction with the accompanying drawings.

DESCRIPTION OF THE PREFERRED EMBODIMENTS

Figure 1:
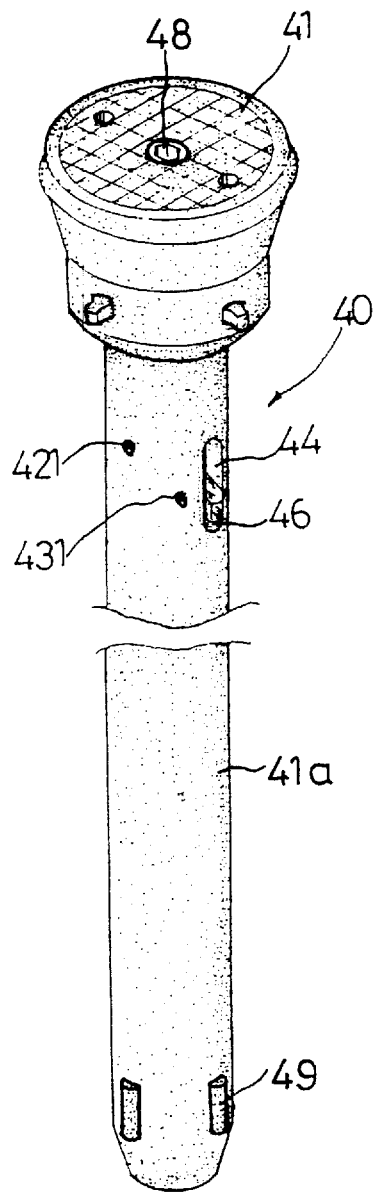
FIG. 1 is a perspective view of a float pin in accordance with the present invention.
Figure 2:
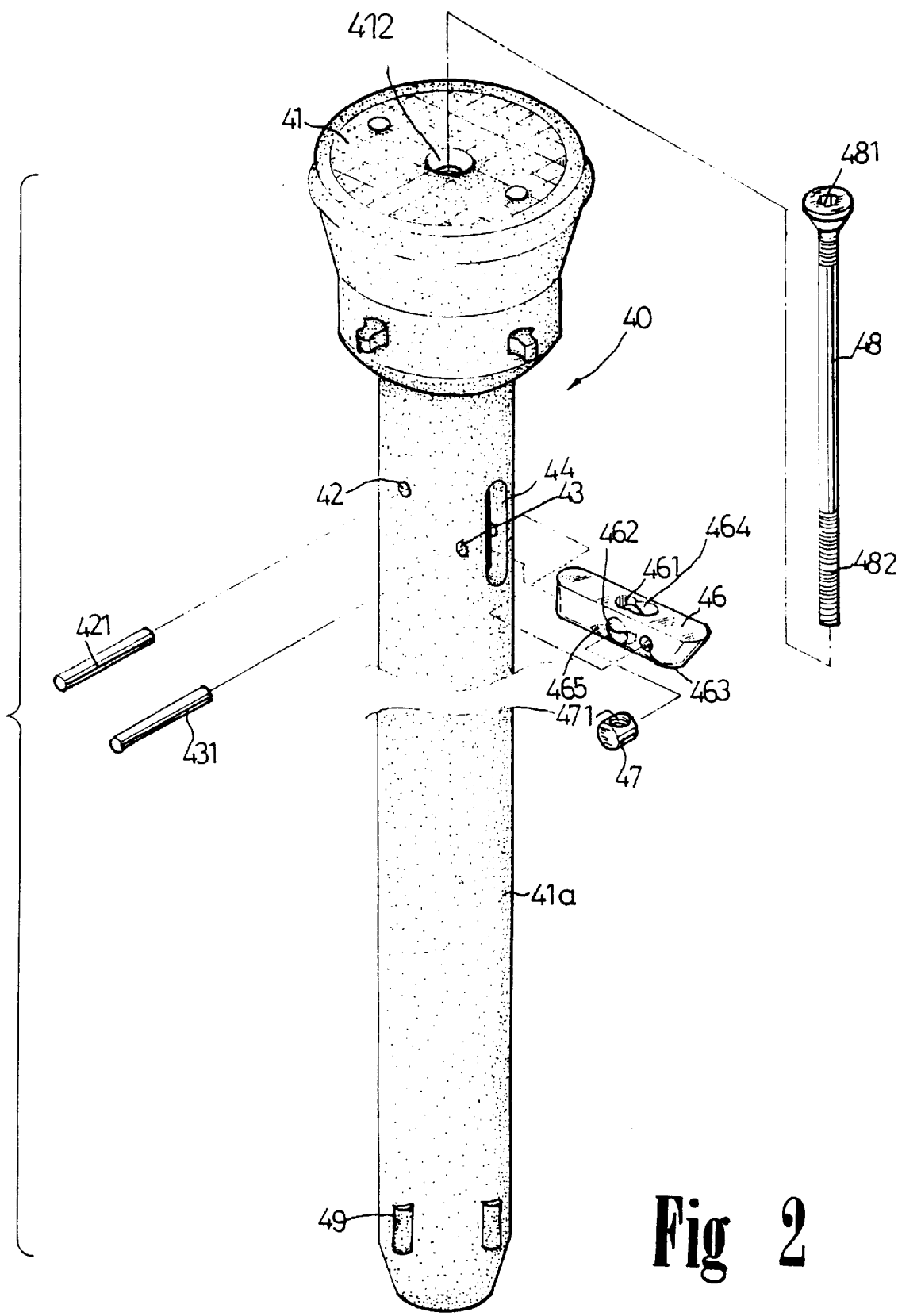
FIG. 2 is an enlarged exploded view of the float pin in accordance with the present invention.
Figure 3:
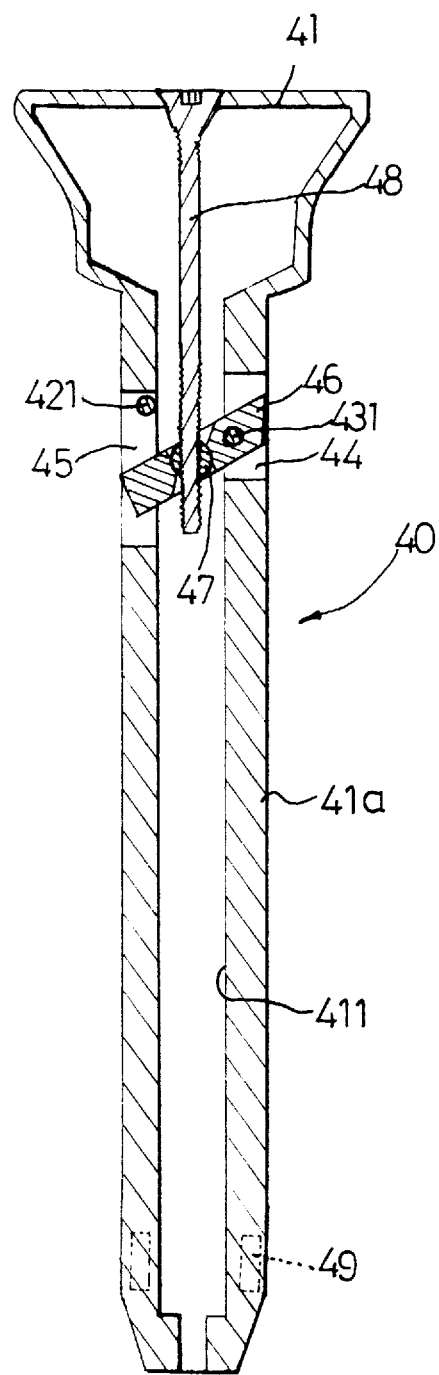
FIG. 3 is a cross sectional view of the pin.

Referring to FIGS. 1 to 9 of the drawings and initially to FIGS. 1 to 3, a float pin in accordance with the present invention is designated by reference number "40" and includes an enlarged head 41 and a stem 41a. As shown in FIG. 3, the pin 40 includes a longitudinal bore 411 extending therethrough, and two partially aligned openings 44 and 45 are defined in a periphery of the stem 41a and in communication with the longitudinal bore 411. Two bores 42 and 43 are defined in the periphery of the stem 41a and respectively extend in a direction transverse to the openings 44 and 45, as shown in FIGS. 1 and 2, and an axle 421 and a pivotal axle 431 are respectively extended through the bores 42 and 43, as shown in FIGS. 1 and 3. In addition, a plurality of circumferentially spaced protrusions 49 are provided on a distal end of the stem 41a.

A stop member 46 is mounted in the pin 40 and extends transverse to a longitudinal axis of the pin 40 with a first end thereof in the opening 44 and a second end thereof in the opening 45, as shown in FIG. 3. The stop member 46, as shown in FIG. 2, includes a vertical hole 461 extending along a direction substantially parallel to the longitudinal axis of the pin 40 and a lateral hole 462 extending through two sides of the stop member 46 and in communication with the vertical hole 461. A first recess 464 is defined in an upper part of a periphery defining the vertical hole 461, and a second recess 465 is defined in a lower part of the periphery defining the vertical hole 461, and the first and second recesses 464 and 465 are symmetric to a vertical axis along which the vertical hole 461 extends. A block 47 is received in the lateral hole 462 of the stop member 46 and includes a screw hole 471 in alignment with the vertical hole 461. In addition, an axle hole 463 is defined in the stop member 46 and in alignment with the bore 43.

Referring to FIGS. 2 and 3, the enlarged head 41 of the pin 40 includes a recess 412 in an upper end thereof, and an inner pin 48 is mounted in the pin 40 and includes an enlarged head received in the recess 412. Preferably, the enlarged head of the inner pin 48 includes a hexagonal recess 481 so as to be operated by a wrench (not shown). In addition, the inner pin 48 includes a threaded distal end 482 which extends through the screw hole 471 of the block 47.

In assembly, the block 47 is mounted in the lateral hole 462 of the stop member 46 which is then extended in the openings 44 and 45. Then, the axles 421 and 431 are respectively inserted through the bores 42 and 43 in which the pivotal axle 431 extends through the axle hole 463 of the stop member 46. Thereafter, the inner pin 48 is mounted into the pin 40 with the enlarged head of the former received in the recess 412 of the latter and with the threaded distal end 482 in threading engagement with the screw hole 471 of the block 47.

Figure 4:
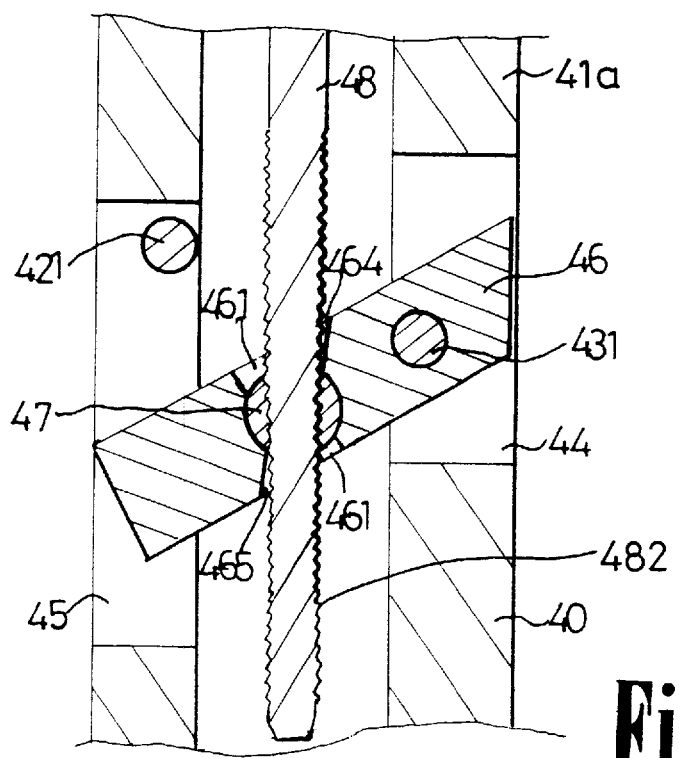
FIGS. 4 and 5 are partial cross sectional views, in an enlarged scale, illustrating operation of the pin.
Figure 5:
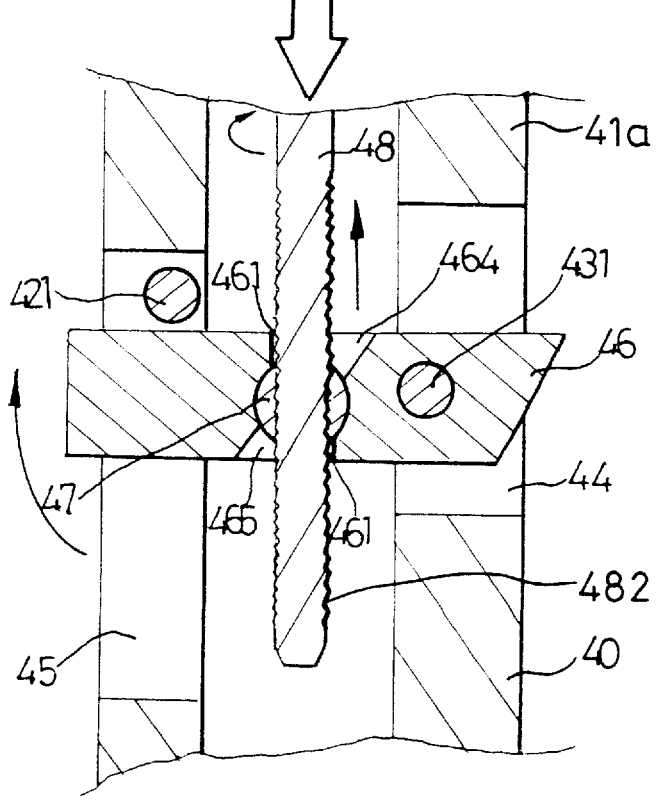

Referring now to FIG. 4, the inner pin 48 is in a position in which the threaded distal end 482 of the inner pin 48 received in the screw hole 471 of the block 47 bears against peripheral walls defining the first and second recesses 464 and 465, while the block 47 is inside the openings 44 and 45. When the inner pin 48 is rotated in a direction through an angle and thus moves upwardly due to the threading engagement between the threaded distal end 482 and the screw hole 471 of the block 47, the stop member 46 pivots about the pivotal axle 431 from an inclined position shown in FIG. 4 to a horizontal position shown in FIG. 5, wherein the threaded distal end 482 bears against the peripheral wall defining the vertical hole 461 and wherein two ends of the stop member 46 extend beyond the pin 40. The axle 421 is used to limit movement of the stop member 46. If the inner pin 48 is pushed downwardly, the stop member 46 is moved back to the position shown in FIG. 4.

Figure 6:
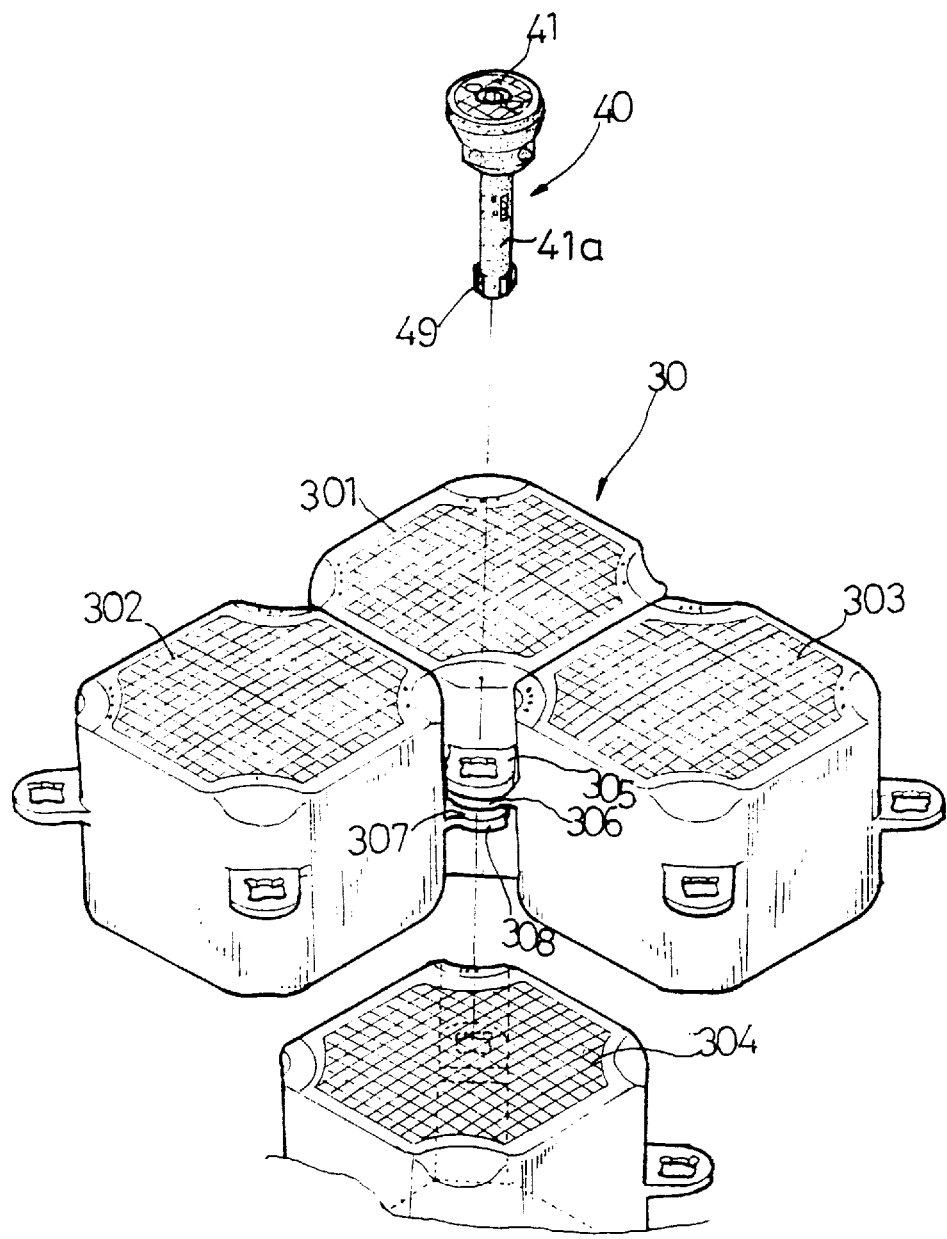
FIG. 6 is a perspective view of a float assembly and the float pin in accordance with the present invention.

FIG. 6 illustrates a float assembly 30 including a number of floats 301, 302, 303, and 304 each of which has a number of ears 305, 306, 307, 308 mounted to an outer periphery thereof. As shown in FIG. 6, the floats 301–304 are arranged in a manner such that the ears 305–308 respectively of the four floats 301–304 are aligned. Each ear 305–308 is holed and includes a number of recesses 3051 defined in an inner periphery thereof (see FIG. 8).

Figure 8:
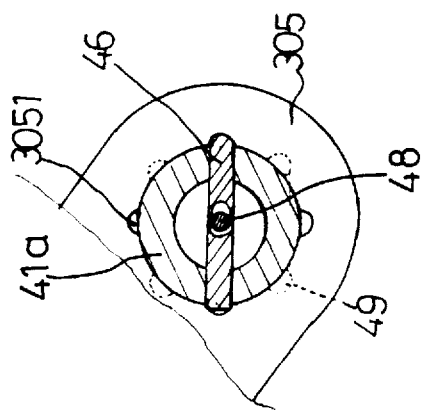
FIG. 8 is a cross sectional view of the pin and the holed ears of the floats.
Figure 7:
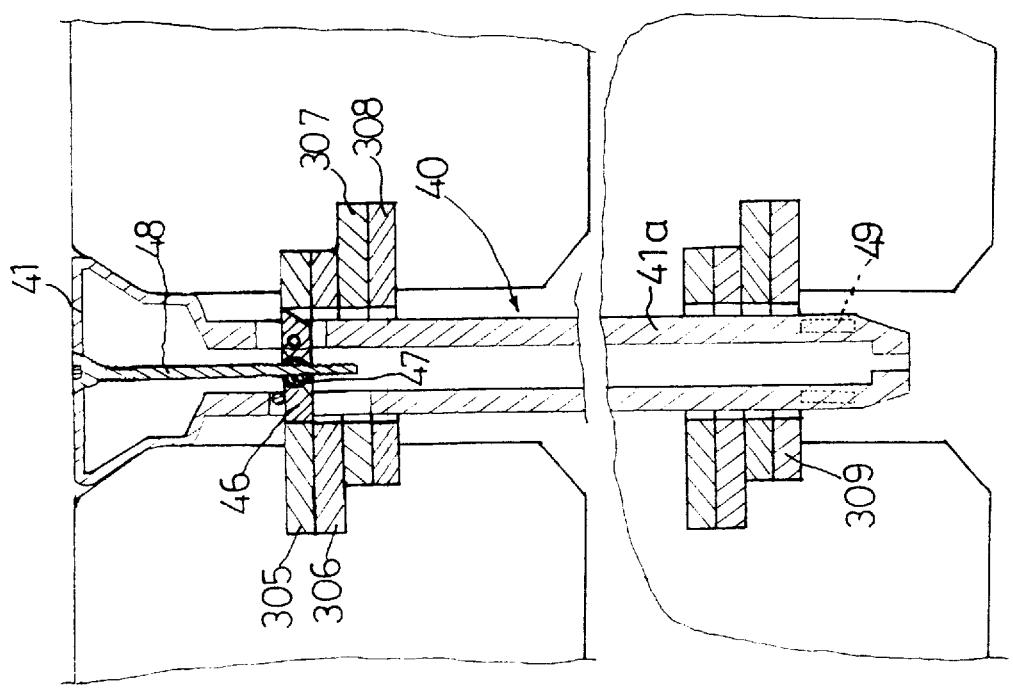
FIG. 7 is a schematic cross sectional view illustrating engagement of the pin in the holed ears of the floats of the float assembly.

Referring to FIGS. 7 and 8, when inserting the pin 40 through the aligned ears 305–308, the protrusions 49 of the pin 40 are firstly aligned with the recesses 3051 of the ears 305–308. After extending the pin 40 through the ears 305–308, the inner pin 48 of the pin 40 is rotated through an angle (e.g., by using a wrench inserting into the hexagonal recess 481 of the inner pin 48) to make the stop member 46 move to a position shown in FIG. 5, in which the two ends of the stop member 46 extends into two aligned recesses 3051 of the ears 305 (see FIG. 7). Accordingly, rotation of the pin 40 is avoided. In addition, the protrusions 49 of the pin 40 are no longer in alignment with the recesses 3051 which further prevents removal of the pin 40 from the ears 305–308. As mentioned above, when the inner pin 48 is pushed downwardly, the stop member 46 moves to the position shown in FIG. 4, and the pin 40 may be removed after rotating the pin 40 to a position where the protrusions 49 align with the recesses 3051 of the ears 305–308.

Figure 9:
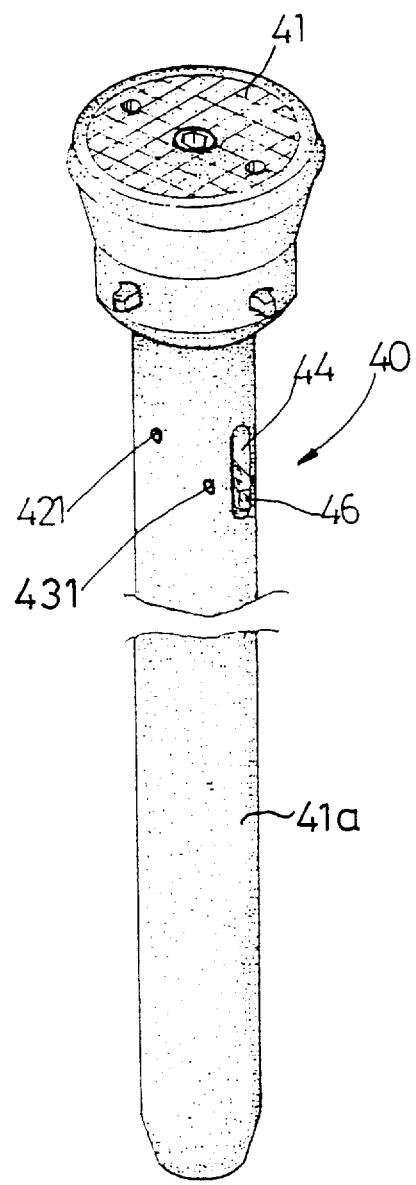
FIG. 9 is a modified embodiment of the pin in accordance with the present invention.
Figure 10:
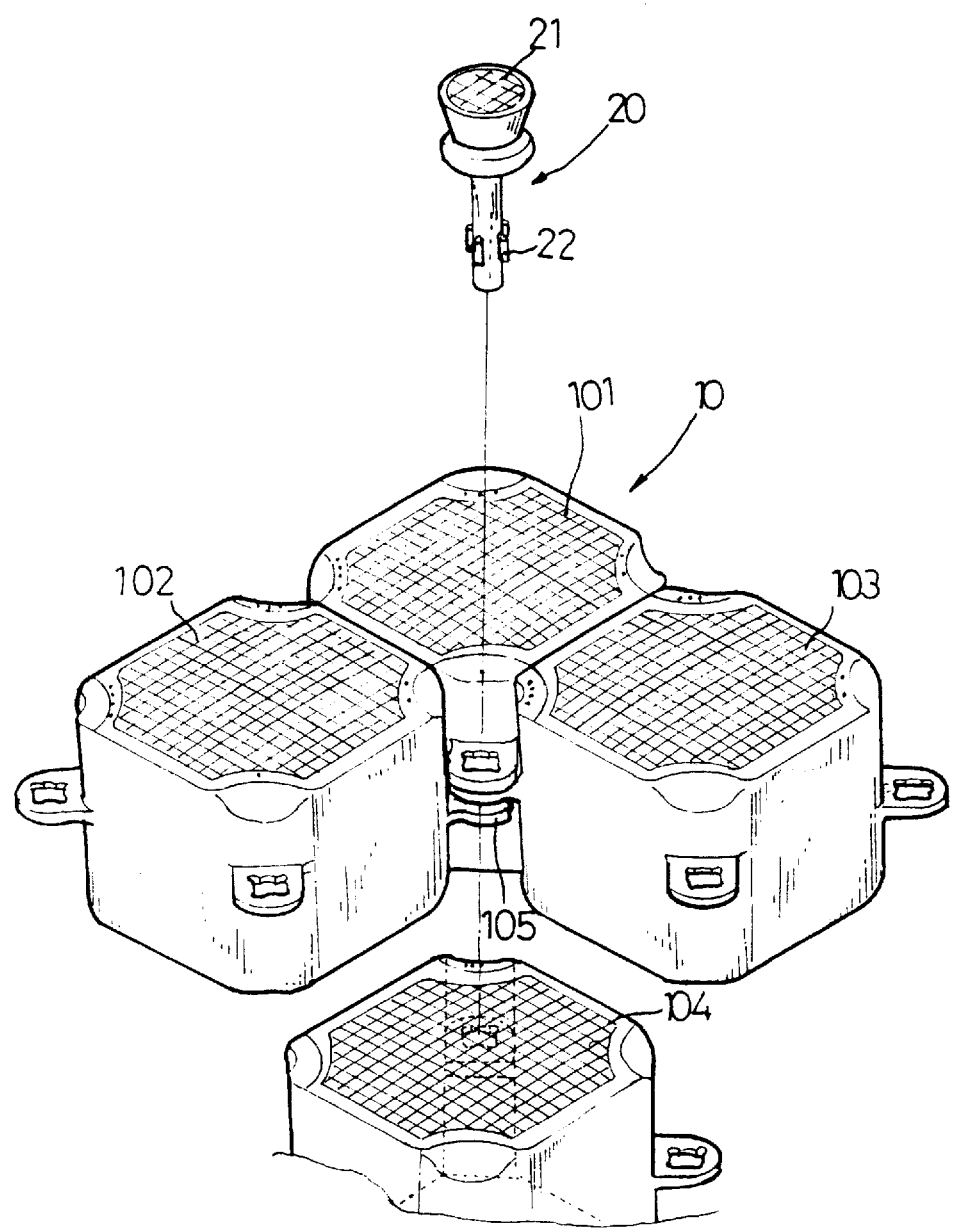
FIG. 10 is a perspective view of a float assembly with a conventional pin.
Figure 11:
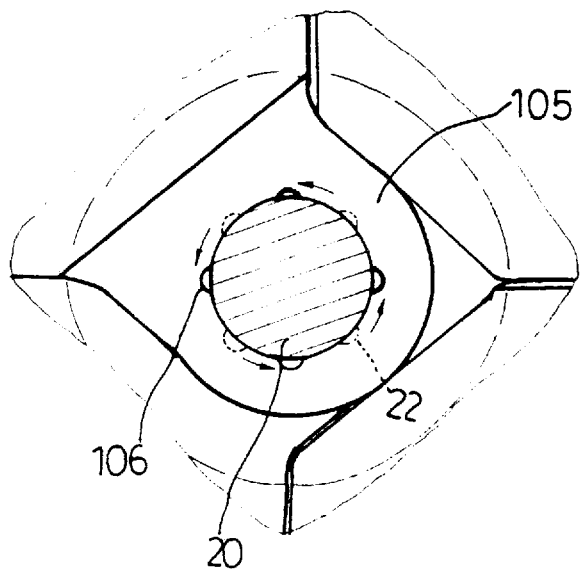
FIG. 11 is a schematic cross sectional view illustrating engagement of the conventional pin and the ears of the float assembly.
Figure 12:
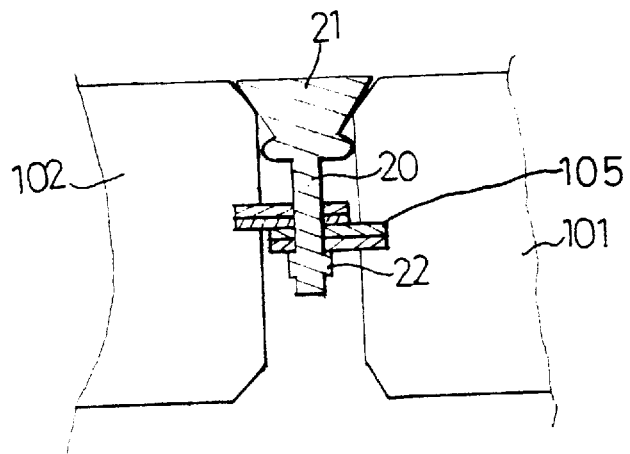
FIG. 12 is a schematic side elevational view, partially sectioned, illustrating engagement of the conventional pin and the ears of the float assembly.

FIG. 9 illustrates a modified embodiment of the invention in which the protrusions 49 on the distal end of the stem 41a are omitted.

It is appreciated that the pin can be lengthened so as to secure two layers of floats which may support a weight of 90 tones such that small boats, hydro-motorcycles and other small vessels may be moved onto the floats to provide a wider application.

Although the invention has been explained in relation to its preferred embodiment, it is to be understood that many other possible modifications and variations can be made without departing from the spirit and scope of the invention as hereinafter claimed.

What is claimed is:

1. A pin for fastening a plurality of floats each having a plurality of holed ears, each of the holed ears including a plurality of first recesses defined in an inner periphery thereof, said pin comprising an enlarged head and a stem, the enlarged head of the pin including a second recess in an upper end thereof, said pin including a longitudinal bore extending through the enlarged head portion and the stem, a first opening and a second opening being defined in a periphery of the stem and partially aligned and in communication with the longitudinal bore, a second bore being defined in the periphery of the stem and extending in a direction transverse to the first opening;

a stop member being mounted in the pin and extending transverse to a longitudinal axis of the pin with a first end thereof in the first opening and a second end thereof in the second opening, the stop member including a vertical hole extending along a direction substantially parallel to the longitudinal axis of the pin and a lateral hole extending through two sides of the stop member and in communication with the vertical hole, an axle hole being defined in the stop member and in alignment with the second bore, a pivotal axle extending through the second bore and the axle hole, a block being received in the lateral hole of the stop member and including a screw hole in alignment with the vertical hole; and an inner pin being mounted in the pin and including an enlarged head received in the second recess of the enlarged head of the pin, the inner pin further including a threaded distal end which extends through the screw hole of the block;

the inner pin being rotatable between a first position in which rotational movements of the pin are allowed and a second position in which rotational movements of the pin are prevented;

wherein the block is inside the first opening and the second opening of the pin when the inner pin is in the first position, and when the inner pin is rotated through an angle to the second position, the stop member pivots about the pivotal axle to a position in which two ends of the stop member extend beyond the pin for engaging with the first recesses of the holed ears of the floats, thereby preventing rotating movements of the pin.

2. The pin according to claim 1, wherein the pin includes a plurality of circumferentially spaced protrusions provided on a distal end of the stem thereof.

3. The pin according to claim 1, further comprising a third recess defined in an upper part of a periphery defining the vertical hole and a fourth recess defined in a lower part of the periphery defining the vertical hole, and the third and the second recesses being symmetric to a vertical axis along which the vertical hole extends.

4. The pin according to claim 1, wherein the enlarged head of the inner pin includes a hexagonal recess.

5. The pin according to claim 1, further comprising a third bore defined in the periphery of the stem and extending in a direction transverse to the second opening, and an axle extending through the third bore to limit movement of the stop member.

* * * * *